United States Patent
Morgen et al.

(10) Patent No.: US 12,244,205 B2
(45) Date of Patent: Mar. 4, 2025

(54) ELECTRIC MACHINE WITH ELECTRICALLY INSULATED STATOR AND ROTOR

(71) Applicant: Schaeffler Technologies AG & Co. KG, Herzogenaurach (DE)

(72) Inventors: Christian Morgen, Haueneberstein (DE); Volker Steinert, Gleisweiler (DE); Dennis Kuhl, Bühl (DE); Christian Nolte, Haßfurt (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 244 days.

(21) Appl. No.: 17/618,612

(22) PCT Filed: Jun. 17, 2020

(86) PCT No.: PCT/DE2020/100511
§ 371 (c)(1),
(2) Date: Dec. 13, 2021

(87) PCT Pub. No.: WO2021/000989
PCT Pub. Date: Jan. 7, 2021

(65) Prior Publication Data
US 2022/0239181 A1  Jul. 28, 2022

(30) Foreign Application Priority Data
Jul. 4, 2019 (DE) ............... 10 2019 118 122.4

(51) Int. Cl.
*H02K 5/16* (2006.01)
*H02K 7/00* (2006.01)
*H02K 7/08* (2006.01)

(52) U.S. Cl.
CPC ............... *H02K 5/16* (2013.01); *H02K 7/003* (2013.01); *H02K 7/08* (2013.01)

(58) Field of Classification Search
None
See application file for complete search history.

(56) References Cited

U.S. PATENT DOCUMENTS 3,228,597 A * 1/1966 Walker ............... H02K 7/16
310/90

FOREIGN PATENT DOCUMENTS

| CN | 1351403 A | 5/2002 |
|---|---|---|
| CN | 201969863 U | 9/2011 |
| CN | 107666205 A | 2/2018 |
| DE | 1066659 B | 10/1959 |
| DE | 19544715 A1 | 6/1996 |
| DE | 20306902 U1 | 9/2004 |

(Continued)

OTHER PUBLICATIONS

Machine translation of DE 102006045178 (Year: 2008).*

(Continued)

*Primary Examiner* — Bernard Rojas
(74) *Attorney, Agent, or Firm* — Volpe Koenig

(57) ABSTRACT

An electric machine includes a stator, a rotor, a housing and a shaft. The stator is connected to the housing via an electrically insulating torque support. An electrically insulating flange is disposed on the shaft. The shaft is connected to a flange of a bearing shaft via said flange, the bearing shaft housed in a bearing which is arranged in the housing.

7 Claims, 1 Drawing Sheet

(56) References Cited

FOREIGN PATENT DOCUMENTS

DE     102006045178 A1 *  4/2008  .............. F16C 19/52

OTHER PUBLICATIONS

Author: Katharina Juschkat Source: Title: Forscher entwickeln direktgekühlten E-Motor aus Kunststoff / Researchers develop direct-cooled electric motor made of plastic; by: Katharina Juschkat; Date: May 2, 2019 https://www.konstruktionspraxis.vogel.de/forscher-entwickeln-direktgekuehlten-e-motor-aus-kunststoff-a-796239/.
Cheng Daxian: "Mechanical Design Atlas", Dec. 31, 1997, Chemical Industry Press, pp. 287.

* cited by examiner

ELECTRIC MACHINE WITH ELECTRICALLY INSULATED STATOR AND ROTOR

CROSS-REFERENCE TO RELATED APPLICATIONS

This application is the U.S. National Phase of PCT Appln. No. PCT/DE2020/100511 filed Jun. 17, 2020, which claims priority to DE 102019118122.4 filed Jul. 4, 2019, the entire disclosures of which are incorporated by reference herein.

TECHNICAL FIELD

The disclosure relates to an electric machine having a stator and rotor that are electrically insulated against a housing of the electric machine, more generally against electrically conductive components of the electric machine that can be touched from the outside.

BACKGROUND

In electric machines, the individual turns of the conductors in windings on the stator and/or rotor must be electrically insulated, for example by painting the conductors, in order to ensure the flow of current required for the functioning of the electric machine; in particular, it is important to avoid undesired current flows, for example through short circuits between turns. In addition to the windings themselves, their interconnections and contacts must also be insulated for this purpose. This type of insulation is referred to as functional insulation.

Regardless of this, it must also be ensured by means of suitable electrical insulation that, in particular in the event of a fault, there is no danger to persons or systems. This type of insulation is referred to as basic insulation and is therefore used for the basic protection of parts that are under dangerous voltage (see also DIN EN 60664). So far, it has been achieved by insulating material, such as paper, in grooves for windings on the stator and/or rotor. This requires material expenditure, is complex to assemble and also takes up space.

SUMMARY

The object of the disclosure is therefore to specify an electric machine in which the basic insulation is achieved with less effort.

This object is achieved by an electric machine as described herein.

The electric machine according to the disclosure has a stator and a housing. According to the disclosure, an electrically insulating torque support is provided that mechanically connects the stator to the housing. Here, a torque support is a mechanical connection that transmits a torque between the stator and the housing, so that ultimately, when the electric machine is in operation, the stator is at rest relative to the housing and its installation environment, sometimes apart from vibrations. Since the torque support is designed to be electrically insulating, the required basic insulation between the stator and the housing is achieved. With regard to its electrical resistance, the torque support can of course be configured according to the operating conditions and electrical insulation requirements of the electric machine, for example by selecting an adequate electrically insulating material for the torque support. The torque support can be achieved with fewer components and assembly steps than the introduction of insulation material into all slots of the stator; in the slots of the stator you can limit yourself to the above-mentioned functional insulation, for example by using a coated conductor for the windings. In addition, the torque support, which is required anyway for mechanical reasons, does not require any additional installation space in the housing and, in the embodiment according to the disclosure set out above, makes installation space for insulation material in the stator unnecessary. As before, the stator can be made entirely or partially of metal so that no further structural adaptations are required. The housing can also be made of metal. Compared to a housing made of plastic, problems with regard to electromagnetic compatibility are avoided. However, according to the disclosure, the required basic insulation is achieved, in particular with a metal housing.

The basic insulation is thus achieved with less effort than in the prior art.

In an advantageous embodiment, the basic insulation for a rotor of the electric machine is also achieved. More precisely, here a shaft of a rotor of the electric machine has a flange made of electrically insulating material. The shaft, and thus the rotor, can be mechanically coupled to other components in an electrically insulating manner via the flange. In this way, the basic insulation for the rotor is also achieved with fewer components and fewer assembly steps than would be required to introduce insulation material into all the grooves of the rotor. Here, too, the effort is reduced compared to the prior art. In the grooves of the rotor, you can restrict yourself to the above-mentioned functional insulation, for example by using a coated conductor for the windings. In a further development, the flange of the shaft is connected to a flange of a bearing shaft; the bearing shaft is in turn received in a bearing arranged in the housing. Ultimately, the rotor can thus be mounted mechanically on the housing without there being an electrically conductive connection to the housing along the shaft. In one embodiment, the shaft has a flange made of electrically insulating material at opposite ends and can thus be mechanically supported on both sides in the housing without there being an electrically conductive connection between the housing and the rotor along the shaft. It is also conceivable that the shaft is made entirely of electrically insulating material and has a flange at one or both ends. The shaft itself can, however, also be made from one metal or from several different materials. It is crucial that the flange or flanges on the shaft are electrically insulating.

In a modification of the disclosure, an electric machine has a rotor and a shaft of the rotor. According to the disclosure, an electrically insulating flange is provided on the shaft, as already described above. In this modification, unlike in the embodiments described above, it is not necessary for an electrically insulating torque support to be provided between a stator of the electric machine and a housing of the electric machine. The basic insulation for the stator could then be achieved in a conventional manner. In this modification, too, it is conceivable that the flange on the shaft is connected to a flange of a bearing shaft, and the bearing shaft is received in a bearing arranged in the housing. Likewise, the shaft can each have a flange made of electrically insulating material at opposite ends. In this modification of the disclosure, too, the shaft can be made entirely of electrically insulating material and have a flange at one end or on both sides. The shaft itself can, however, also be made from one metal or from several different materials. It is crucial that the flange or flanges on the shaft are electrically insulating.

BRIEF DESCRIPTION OF THE DRAWINGS

The disclosure and the advantages thereof are explained in more detail below with reference to the accompanying schematic drawings.

DETAILED DESCRIPTION

For the purpose of explanation, the drawings show only examples of how an electric machine according to the disclosure can be configured. The drawings are not to be construed as limiting the disclosure to the examples shown.

Figure 1:
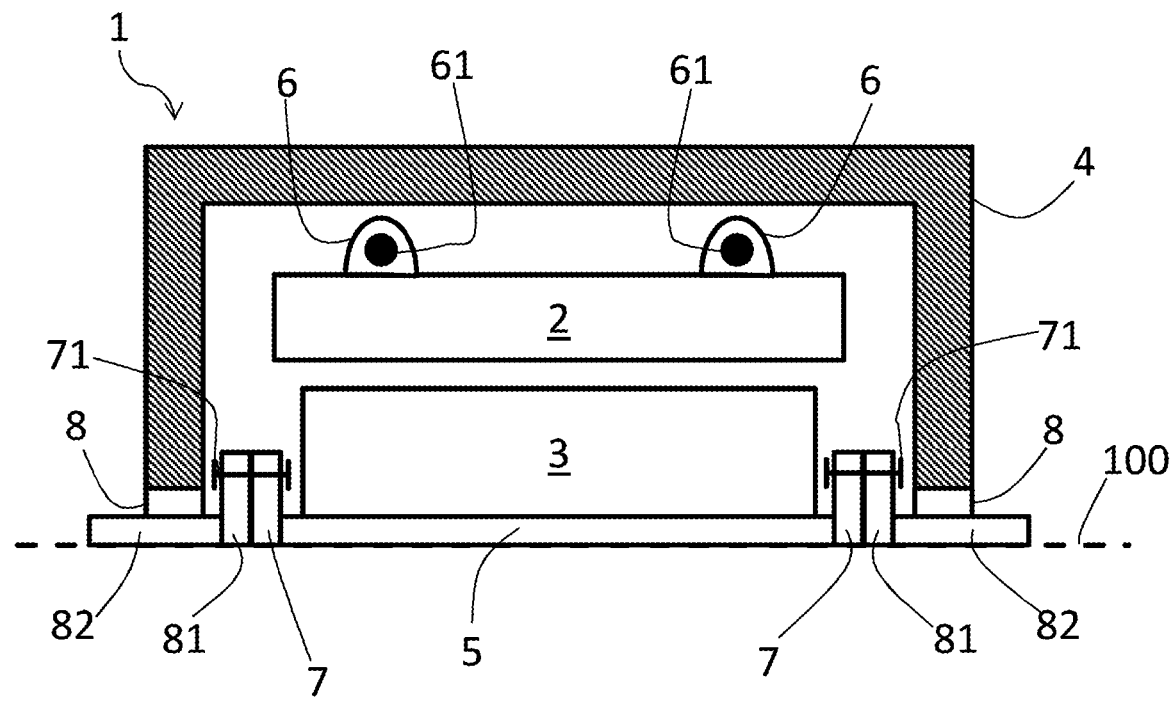
FIG. 1 shows an embodiment of an electric machine according to the disclosure.

FIG. 1 shows an embodiment of an electric machine 1 according to the disclosure. The electric machine 1 comprises a stator 2, a rotor 3, a housing 4 and a shaft 5 of the rotor 3. According to the disclosure, a torque support 6 made of electrically insulating material is provided, which mechanically connects the stator 2 to the housing 4, in the embodiment shown, without restricting the disclosure to this, by means of a screw connection 61. This achieves a mechanical fixation of the stator 2 with respect to the housing 4 without there being an electrically conductive connection between the stator 2 and the housing 4.

Furthermore, the shaft 5, which carries the rotor 3, has a flange 7 made of electrically insulating material at both ends. Each flange 7 is mechanically connected to a flange 81, for example, and without restricting the disclosure thereto, via a screw connection 71. Each flange 81 in turn is connected to a bearing shaft 82. Each bearing shaft 82 is received in a bearing 8, which is provided in the housing 4. Thus, ultimately, the shaft 5, and thus the rotor 3, is mechanically supported in the housing 4 without there being an electrically conductive connection between the rotor 3 and the housing 4 along the shaft 5.

Also shown is an axis of rotation 100 for the electric machine 1, about which the shaft 5 and the rotor 3 rotate when the electric machine 1 is in operation. For the sake of completeness, it is mentioned that FIG. 1 shows a sectional view through the electric machine 1, in which only part of the electric machine 1 is shown on one side of the axis of rotation 100.

Figure 2:
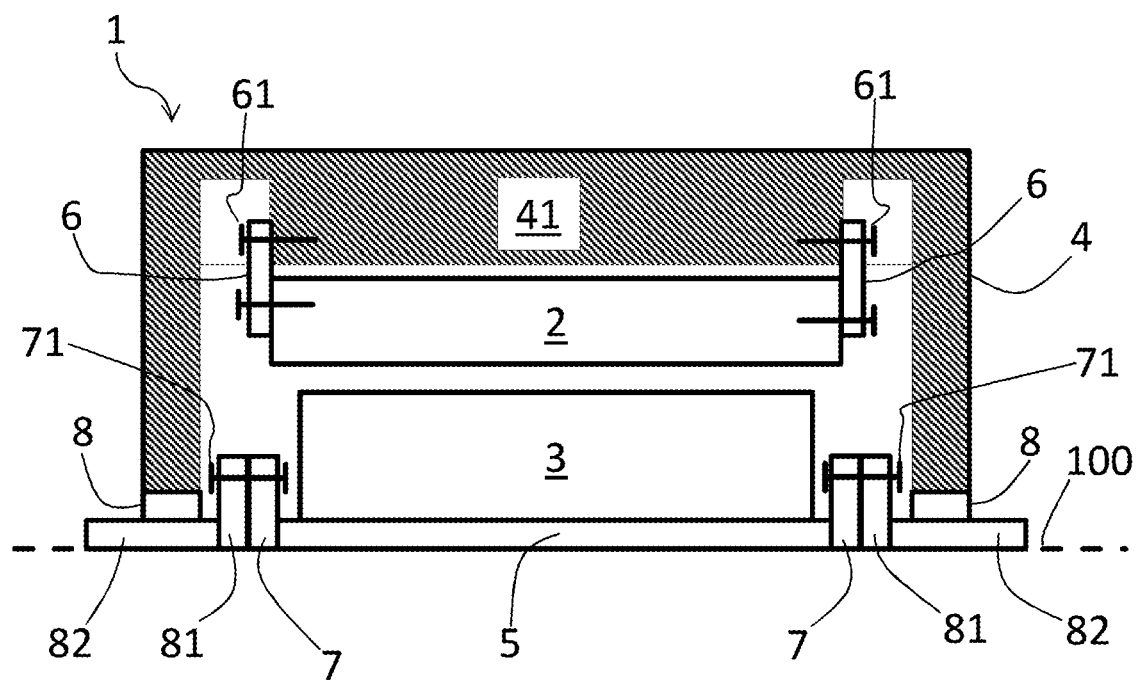
FIG. 2 shows a further embodiment of an electric machine according to the disclosure.

FIG. 2 shows a further embodiment of an electric machine 1 according to the disclosure. The elements shown have already largely been explained in the context of FIG. 1. The difference between the embodiment shown here and the embodiment shown in FIG. 1 is the design of the torque support 6 made of electrically insulating material. The torque support 6 is attached to the front side on a projection 41 of the housing 4. In this embodiment, too, a mechanical fixation of the stator 2 with respect to the housing 4 is achieved without an electrically conductive connection between the stator 2 and the housing 4 being established. Here, the torque support 6 is connected to the stator 2 and the projection 41 by screw connections 61, without the disclosure being restricted thereto.

LIST OF REFERNCE NUMBERS

1 Electric machine
2 Stator
3 Rotor
4 Housing
5 Shaft
6 Torque support
7 Flange
8 Bearing
41 Projection
61 Screw connection
71 Screw connection
81 Flange
82 Bearing shaft
100 Axis of rotation

The invention claimed is:

1. An electric machine comprising: a stator and a housing, wherein
   an electrically insulating torque support mechanically connects the stator to the housing;
   wherein a shaft of a rotor of the electric machine has a flange made of electrically insulating material, the flange of the shaft is configured to receive a fastener;
   wherein the flange of the shaft is connected to a flange of a bearing shaft with a fastener, and the bearing shaft is housed in a bearing arranged in the housing;
   wherein the shaft is electrically isolated from the bearing shaft; and
   wherein the flange of the shaft abuts the flange of the bearing shaft.

2. The electric machine according to claim 1, wherein the shaft has two flanges made of electrically insulating material at opposite ends respectively.

3. An electric machine comprising: a rotor and a shaft of the rotor, wherein
   a flange made of electrically insulating material is disposed on the shaft, the flange of the shaft is configured to receive a fastener;
   wherein the flange on the shaft is connected to a flange of a bearing shaft with a fastener, and the bearing shaft is housed in a bearing arranged in a housing of the electric machine;
   wherein the shaft is electrically isolated from the bearing shaft; and
   wherein the flange of the shaft abuts the flange of the bearing shaft.

4. The electric machine according to claim 3, wherein the shaft has two flanges made of electrically insulating material at opposite ends respectively.

5. The electric machine according to claim 1, wherein the electrically insulating torque support mechanically connects the stator to the housing via a screw connection.

6. The electric machine according to claim 1, wherein the housing includes a projection and the electrically insulating torque support is attached on the projection of the housing.

7. The electric machine according to claim 6, wherein the electrically insulating torque support is connected to the stator and the projection by screw connections.

* * * * *